(12) United States Patent
Tsou et al.

(10) Patent No.: US 12,149,157 B2
(45) Date of Patent: Nov. 19, 2024

(54) CONTROLLER APPLIED TO A POWER CONVERTER AND OPERATIONAL METHOD THEREOF

(71) Applicant: Leadtrend Technology Corp., Hsinchu County (TW)

(72) Inventors: Ming-Chang Tsou, Hsinchu County (TW); Chao-Chih Lin, Hsinchu County (TW); Meng-Jen Tsai, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 265 days.

(21) Appl. No.: 17/983,406

(22) Filed: Nov. 9, 2022

(65) Prior Publication Data

US 2024/0063706 A1 Feb. 22, 2024

(30) Foreign Application Priority Data

Aug. 17, 2022 (TW) .................................. 111130879

(51) Int. Cl.
*H02M 1/00* (2007.01)
*H02M 3/335* (2006.01)

(52) U.S. Cl.
CPC ....... *H02M 1/0025* (2021.05); *H02M 1/0058* (2021.05); *H02M 3/33507* (2013.01)

(58) Field of Classification Search
CPC ............ H02M 1/0025; H02M 1/0058; H02M 3/33507
See application file for complete search history.

(56) References Cited

U.S. PATENT DOCUMENTS

| | | | |
|---|---|---|---|
| 2013/0223108 A1* | 8/2013 | Xu ........................ | H02M 3/335 363/21.17 |
| 2015/0288286 A1* | 10/2015 | Chu ................... | H02M 3/33507 363/21.12 |
| 2021/0006147 A1* | 1/2021 | Feldtkeller ............ | H02M 1/083 |

* cited by examiner

*Primary Examiner* — Jue Zhang
*Assistant Examiner* — Lakaisha Jackson
(74) *Attorney, Agent, or Firm* — Winston Hsu (57) ABSTRACT

A controller applied to a power converter is installed in a primary side of the power converter. The controller includes a capacitor, an adjustment signal generation circuit, and a discharge circuit. The capacitor is used for generating a tracking voltage. The adjustment signal generation circuit is used for generating an adjustment signal according to a feedback voltage and the tracking voltage. The discharge circuit is used for discharging the capacitor according to the feedback voltage and the adjustment signal. The tracking voltage is used for tracking a state of a magnetizing current of a magnetizing inductor of the primary side of the power converter, and when the tracking voltage consists with the state of the magnetizing current, the tracking voltage is applied to at least one of zero-voltage switching (ZVS) control and quasi-resonant (QR) control of the power converter.

16 Claims, 5 Drawing Sheets

CONTROLLER APPLIED TO A POWER CONVERTER AND OPERATIONAL METHOD THEREOF

BACKGROUND OF THE INVENTION

1. Field of the Invention

The present invention relates to a controller applied to a power converter and an operational method thereof, and particularly to a controller and an operational method thereof that can utilize a detection voltage and a feedback voltage to generate a tracking voltage (or utilize a compensation voltage and the feedback voltage to generate the tracking voltage) to track a state of a magnetizing current of a magnetizing inductor of a primary side of the power converter, wherein the controller not only can be applied to an active-clamp flyback (ACF) power converter, but can also be applied to an asymmetric half-bridge (AHB) flyback power converter.

2. Description of the Prior Art

In the prior art, if a controller applied to an active-clamp flyback (ACF) power converter or an asymmetric half-bridge (AHB) flyback power converter needs to detect a state of a magnetizing current of a magnetizing inductor of a primary side of the active-clamp flyback (ACF) power converter (or the asymmetric half-bridge (AHB) flyback power converter), the controller requires an additional pin and a sensing resistor to detect the state of the magnetizing current, wherein the controller can execute zero-voltage switching (ZVS) control or quasi-resonant (QR) control on the active-clamp flyback (ACF) power converter (or the asymmetric half-bridge (AHB) flyback power converter) according to the state of the magnetizing current. However, the additional pin and the sensing resistor not only increase cost of the controller, but also increase cost of a package for the controller.

Therefore, for a designer of the controller, how to utilize existed pins of the controller to implement the zero-voltage switching control or the quasi-resonant control on the active-clamp flyback (ACF) power converter (or the asymmetric half-bridge (AHB) flyback power converter) has become an important issue.

SUMMARY OF THE INVENTION

An embodiment of the present invention provides a controller applied to a power converter, wherein the controller is installed in a primary side of the power converter. The controller includes a capacitor, an adjustment signal generation circuit, and a discharge circuit. The capacitor is used for generating a tracking voltage. The adjustment signal generation circuit is used for generating an adjustment signal according to a feedback voltage and the tracking voltage. The discharge circuit is used for discharging the capacitor according to the feedback voltage and the adjustment signal, wherein the tracking voltage is used for tracking a state of a magnetizing current of a magnetizing inductor of the primary side of the power converter. When the tracking voltage consists with the state of the magnetizing current, the tracking voltage is applied to at least one of zero-voltage switching (ZVS) control and quasi-resonant (QR) control of the power converter.

Another embodiment of the present invention provides an operational method of a controller applied to a power converter, wherein the controller is installed in a primary side of the power converter, and the controller includes a capacitor, an adjustment signal generation circuit, and a discharge circuit. The operational method includes the capacitor generating a tracking voltage during turning-on of a lower bridge switch of the primary side of the power converter; the discharge circuit discharging the capacitor according to a feedback voltage and an adjustment signal during turning-off of the lower bridge switch; and the adjustment signal generation circuit generating the adjustment signal to the discharge circuit according to the feedback voltage and the tracking voltage. The tracking voltage is used for tracking a state of a magnetizing current of a magnetizing inductor of the primary side of the power converter, and when the tracking voltage consists with the state of the magnetizing current, the tracking voltage is applied to at least one of zero-voltage switching control and quasi-resonant control of the power converter.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
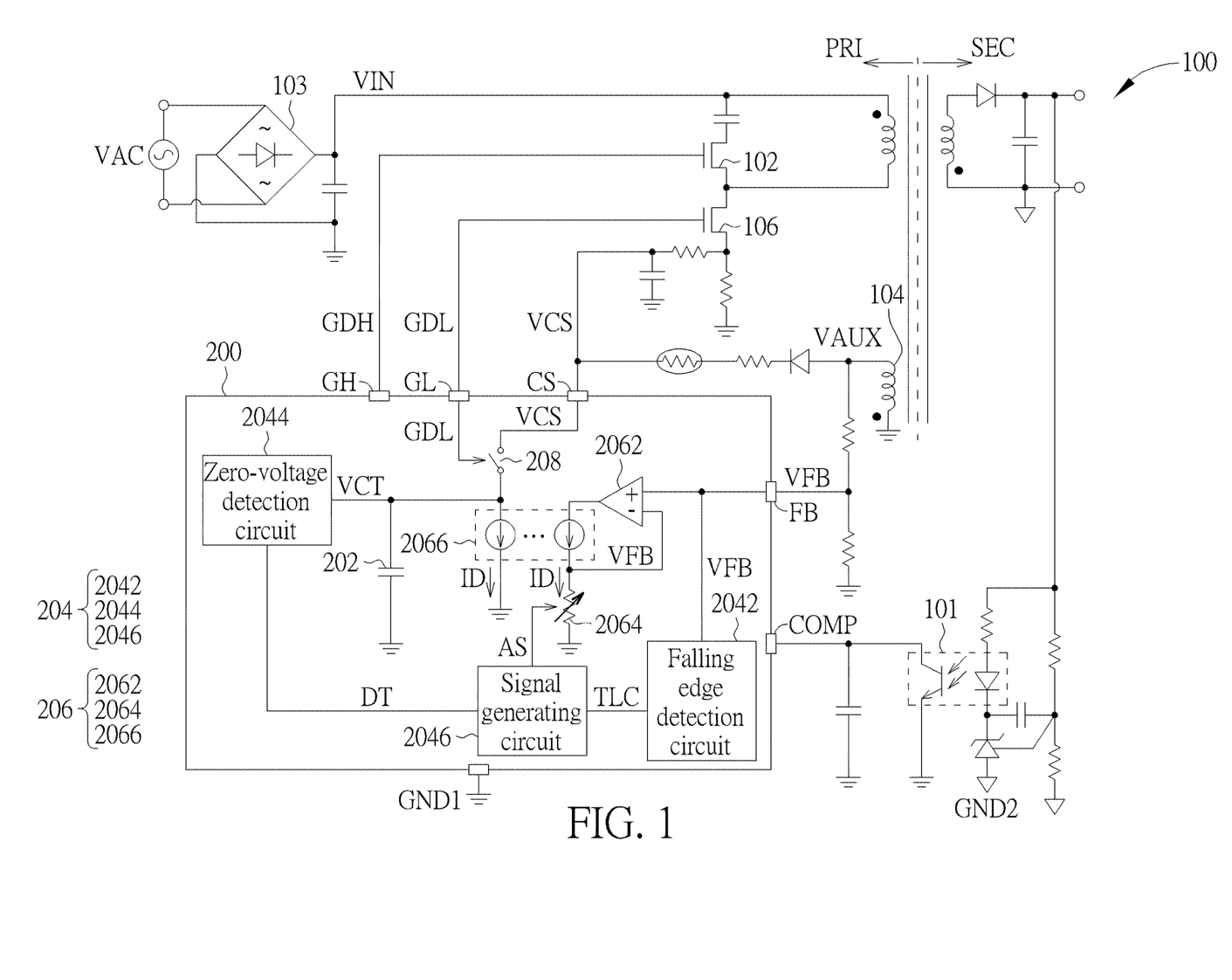
FIG. 1 is a diagram illustrating a controller applied to an active-clamp flyback power converter according to a first embodiment of the present invention.

Please refer to FIG. 1. FIG. 1 is a diagram illustrating a controller 200 applied to an active-clamp flyback power converter 100 according to a first embodiment of the present invention, wherein the controller 200 is installed in a primary side PRI of the active-clamp flyback power converter 100, and the primary side PRI of the active-clamp flyback power converter 100 is isolated from a secondary side SEC of the active-clamp flyback power converter 100 by a photo coupler 101. As shown in FIG. 1, the controller 200 includes a capacitor 202, an adjustment signal generation circuit 204, a discharge circuit 206, and a charge switch 208, wherein the adjustment signal generation circuit 204 includes a falling edge detection circuit 2042, a zero-voltage detection circuit 2044, and a signal generating circuit 2046, and the discharge circuit 206 includes an operational amplifier 2062, a variable resistor 2064, and a current mirror 2066. In addition, one of ordinary skilled in the art should know that the active-clamp flyback power converter 100 can rectify an alternating voltage VAC by a bridge rectifier 103 to generate a direct voltage VIN which is inputted to the primary side PRI of the active-clamp flyback power converter 100. In addition, for simplifying FIG. 1, FIG. 1 only shows elements of the active-clamp flyback power converter 100 and the controller 200 that relate to the present invention.

As shown in FIG. 1, the charge switch 208 has a first terminal, a second terminal, and a control terminal, wherein the first terminal of the charge switch 208 is coupled to a pin CS of the controller 200 and used for receiving a detection voltage VCS, the control terminal of the charge switch 208 is coupled to a pin GL of the controller 200 and used for receiving a lower bridge switch control signal GDL, and the second terminal of the charge switch 208 is coupled to the zero-voltage detection circuit 2044, the current mirror 2066, and the capacitor 202. Therefore, when the lower bridge switch control signal GDL is enabled (corresponding to turning-on of a lower bridge switch 106 of the primary side PRI of the active-clamp flyback power converter 100), the charge switch 208 is turned on to make the capacitor 202 charged according to the detection voltage VCS (i.e. a specific voltage) to generate a tracking voltage VCT. In addition, the pin CS of the controller 200 is also related to over-temperature protection (OTP) function of the controller 200, wherein the over-temperature protection (OTP) function can be referred to U.S. Pat. No. 9,755,421B2, so further description thereof is omitted for simplicity.

As shown in FIG. 1, the falling edge detection circuit 2042 is coupled to a pin FB of the controller 200 and used for receiving a feedback voltage VFB, and the falling edge detection circuit 2042 also detects a resonance time TLC corresponding to the feedback voltage VFB according to the feedback voltage VFB, wherein the feedback voltage VFB corresponds to an auxiliary voltage VAUX of an auxiliary winding 104 of the primary side PRI of the active-clamp flyback power converter 100. The zero-voltage detection circuit 2044 is coupled to the charge switch 208, the current mirror 2066, and the capacitor 202. The zero-voltage detection circuit 2044 is used for receiving the tracking voltage VCT, and detecting a discharge time DT corresponding to the tracking voltage VCT according to tracking voltage VCT. The signal generating circuit 2046 is coupled to the falling edge detection circuit 2042, the zero-voltage detection circuit 2044, and the variable resistor 2064. The signal generating circuit 2046 is used for generating an adjustment signal AS to the variable resistor 2064 according to a difference between the resonance time TLC and the discharge time DT.

As shown in FIG. 1, the operational amplifier 2062 has a first input terminal, a second input terminal, and an output terminal, wherein the first input terminal of the operational amplifier 2062 is used for receiving the feedback voltage VFB. The variable resistor 2064 has a first terminal, a second terminal, and a control terminal, wherein the first terminal of the variable resistor 2064 is coupled to the second input terminal of the operational amplifier 2062 and used for receiving the feedback voltage VFB, the second terminal of the variable resistor 2064 is coupled to ground GND1 (wherein potential of the ground GND1 is different from potential of ground GND2 of the secondary side SEC of the active-clamp flyback power converter 100), and the control terminal of the variable resistor 2064 is coupled to the signal generating circuit 2046 and used for receiving the adjustment signal AS. The adjustment signal AS is used for adjusting a resistance of the variable resistor 2064, and the resistance of the variable resistor 2064 and the feedback voltage VFB are used for determining a discharge current ID. The current mirror 2066 is coupled to the output terminal of the operational amplifier 2062, the second input terminal of the operational amplifier 2062, the variable resistor 2064, and the capacitor 202. The current mirror 2066 is used for mirroring the discharge current ID to discharge the capacitor 202, wherein because when the lower bridge switch control signal GDL is disabled (corresponding to turning-off of the lower bridge switch 106), the charge switch 208 is turned off, meanwhile the discharge current ID can discharge the capacitor 202.

Figure 2:
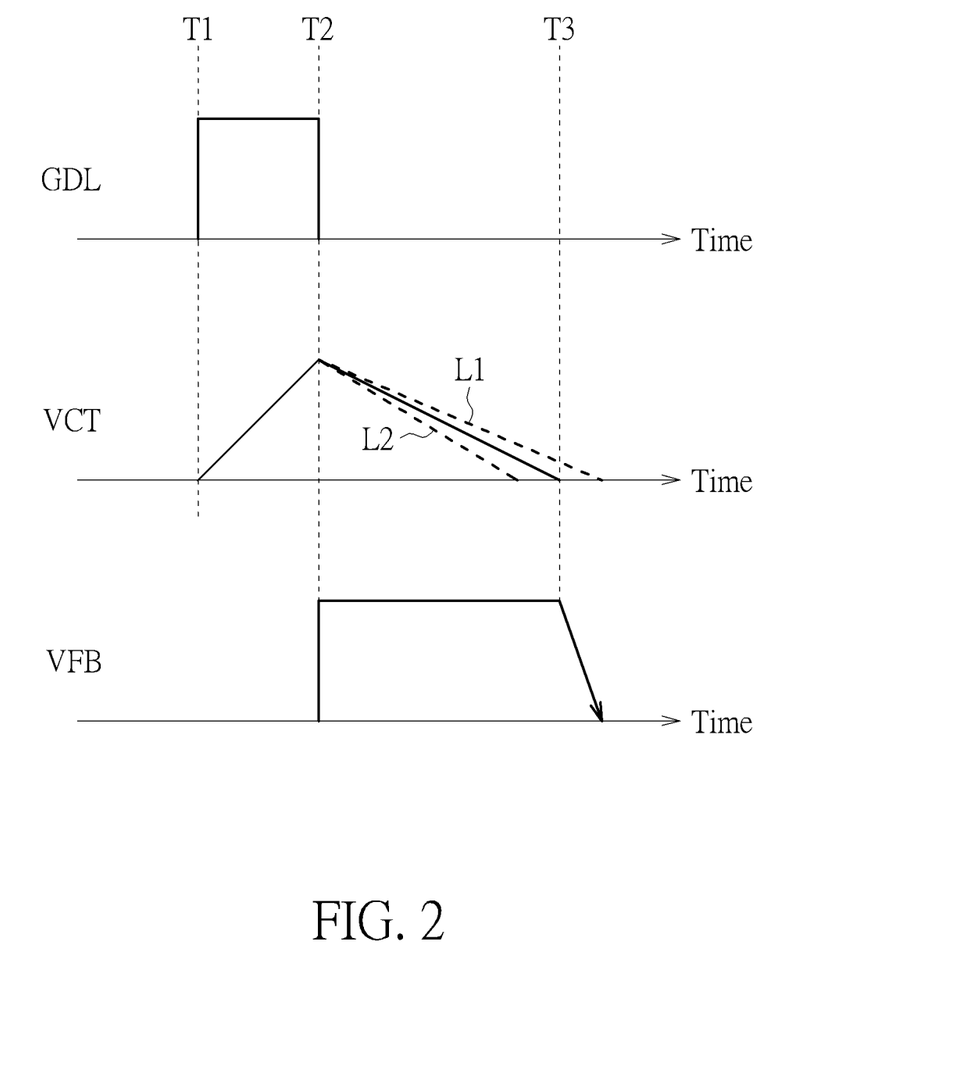
FIG. 2 is a diagram illustrating timings of the lower bridge switch control signal, the tracking voltage, and the feedback voltage.

Please refer to FIG. 2. FIG. 2 is a diagram illustrating timings of the lower bridge switch control signal GDL, the tracking voltage VCT, and the feedback voltage VFB. As shown in FIG. 2, between a time T1 and a time T2, the controller 200 enables the lower bridge switch control signal GDL (corresponding to the turning-on of the lower bridge switch 106), meanwhile the charge switch 208 is turned on, so the capacitor 202 can be charged according to the detection voltage VCS (i.e. the specific voltage), resulting in the tracking voltage VCT being gradually increased until the controller 200 starts to disable the lower bridge switch control signal GDL. At the time T2, because the lower bridge switch control signal GDL is disabled and the feedback voltage VFB corresponds to the auxiliary voltage VAUX of the auxiliary winding 104, the feedback voltage VFB rises. After the time T2, because the lower bridge switch control signal GDL is disabled, the discharge current ID starts to discharge the capacitor 202, resulting in the tracking voltage VCT starting to be decreased until zero (at a time T3). Therefore, as shown in FIG. 2, because during the lower bridge switch control signal GDL being enabled, the tracking voltage VCT is gradually increased until the controller 200 starts to disable the lower bridge switch control signal GDL, and during the lower bridge switch control signal GDL being disabled, the tracking voltage VCT starts to be decreased until zero, the tracking voltage VCT can be used for tracking a state of a magnetizing current of a magnetizing inductor of the primary side PRI of the active-clamp flyback power converter 100.

Before the time 13, the controller 200 disables an upper bridge switch control signal GDH (corresponding to an upper switch 102 of the primary side PRI of the active-clamp flyback power converter 100), and the feedback voltage VFB starts to resonate, wherein the controller 200 transmits the upper bridge switch control signal GDH to the upper switch 102 through a pin GH. Therefore, the falling edge detection circuit 2042 of the controller 200 can detect the resonance time TLC corresponding to an inductor-capacitor resonance point of the feedback voltage VFB through the feedback voltage VFB. Because the zero-voltage detection circuit 2044 can detect the discharge time DT (between the time T2 and the time T3) of the tracking voltage VCT and the falling edge detection circuit 2042 can detect the resonance time TLC corresponding to the inductor-capacitor resonance point of the feedback voltage VFB through the feedback voltage VFB, the signal generating circuit 2046 can generate the adjustment signal AS to the according to the difference between the resonance time TLC and the discharge time DT. As shown in FIG. 2, because the adjustment signal AS can adjust the resistance of the variable resistor 2064, and the resistance of the variable resistor 2064 and the feedback voltage VFB are used for determining the discharge current ID, the discharge current ID is also changed with variation of the resistance of the variable resistor 2064, resulting in the discharge time DT for the discharge current ID discharging the capacitor 202 being also changed accordingly (corresponding to dotted lines L1, L2 shown in FIG. 2). Then, the adjustment signal generation circuit 204 can repeat the above-mentioned steps of generating the adjustment signal AS until a predetermined time (e.g. 250 ns) is locked between the resonance time TLC and the discharge time DT. Meanwhile, the tracking voltage VCT consists with the state of the magnetizing current. In addition, after the predetermined time is locked between the resonance time TLC and the discharge time DT (i.e. the tracking voltage VCT consists with the state of the magnetizing current), if a load (not shown in FIG. 1) coupled to the secondary side SEC of the active-clamp flyback power converter 100 is not changed, the adjustment signal generation circuit 204 stops generating the adjustment signal AS. Because the tracking voltage VCT can track the state of the magnetizing current of the magnetizing inductor of the primary side PRI of the active-clamp flyback power converter 100, when the tracking voltage VCT consists with the state of the magnetizing current, the tracking voltage VCT can be applied to at least one of zero-voltage switching (ZVS) control and quasi-resonant (QR) control of the active-clamp flyback power converter 100, wherein the zero-voltage switching control controls a critical conduction mode (CRM) corresponding to the active-clamp flyback power converter 100, and the quasi-resonant control controls a discontinuous conduction mode (DCM) corresponding to the active-clamp flyback power converter 100. In addition, when the active-clamp flyback power converter 100 operates in the critical conduction mode, the controller 200 can execute the zero-voltage switching control at a first valley of the feedback voltage VFB after the feedback voltage VFB starts to resonate; when the active-clamp flyback power converter 100 operates in the discontinuous conduction mode, the controller 200 can execute the quasi-resonant control at an $N^{th}$ valley of the feedback voltage VFB after the feedback voltage VFB starts to resonate, wherein N is an integer greater than 1. In addition, the critical conduction mode corresponds to the load (not shown in FIG. 1) coupled to the secondary side SEC of the active-clamp flyback power converter 100 being heavy, and the discontinuous conduction mode corresponds to the load being middle or light. In addition, when the active-clamp flyback power converter 100 operates in the critical conduction mode, the zero-voltage switching control can reduce switching loss of the active-clamp flyback power converter 100, and more energy is transferred from the primary side PRI of the active clamp flyback power converter 100 to the secondary side SEC of the active clamp flyback power converter 100 to optimize conversion efficiency of the active-clamp flyback power converter 100. When the active-clamp flyback power converter 100 operates in the discontinuous conduction mode, the quasi-resonant control can softly switch the upper switch 102 and the lower bridge switch 106 to reduce switching loss, and then optimize the conversion efficiency of the active-clamp flyback power converter 100. In addition, one of ordinary skilled in the art should know the zero-voltage switching control and the quasi-resonant control, so further description thereof is also omitted for simplicity.

In addition, because after the controller 200 receives a compensation voltage VCOMP from a pin COMP, the controller 200 can control turning-on time of the lower bridge switch control signal GDL according to the compensation voltage VCOMP, wherein turning-on time of the lower bridge switch control signal GDL can change a peak value of the detection voltage VCS. Therefore, in another embodiment of the present invention, the first terminal of the charge switch 208 is coupled to the pin COMP of the controller 200 and used for receiving the compensation voltage VCOMP. Therefore, when the lower bridge switch control signal GDL is enabled (corresponding to the turning-on of the lower bridge switch 106 of the primary side PRI of the active-clamp flyback power converter 100), the charge switch 208 is turned on to make the capacitor 202 charged according to the compensation voltage VCOMP (meanwhile, the compensation voltage VCOMP is the specific voltage) to generate the tracking voltage VCT.

In addition, in the prior art, if the controller 200 needs to detect the state of the magnetizing current in real time, the controller 200 requires an additional pin and a sensing resistor, both cost of the controller 200 and cost of a package for the controller 200 will be increased. Therefore, the controller 200 utilizes the detection voltage VCS (corresponding to the existed pin CS of the controller 200) and the feedback voltage VFB to generate the tracking voltage VCT (or the controller 200 utilizes the compensation voltage VCOMP (corresponding to the existed pin COMP of the controller 200) and the feedback voltage VFB to generate the tracking voltage VCT) to track the state of the magnetizing current, and then the tracking voltage VCT is applied to at least one of the zero-voltage switching control and the quasi-resonant control of the active-clamp flyback power converter 100. Thus, compared to the prior art, the controller 200 does not require the additional pin and the sensing resistor, so both the cost of the controller 200 and the cost of the package for the controller 200 can be significantly reduced. In addition, any configuration in which the detection voltage VCS and the feedback voltage VFB (or utilizing the compensation voltage VCOMP and the feedback voltage VFB) are utilized to track the state of the magnetizing current falls within the scope of the present invention.

Figure 3:
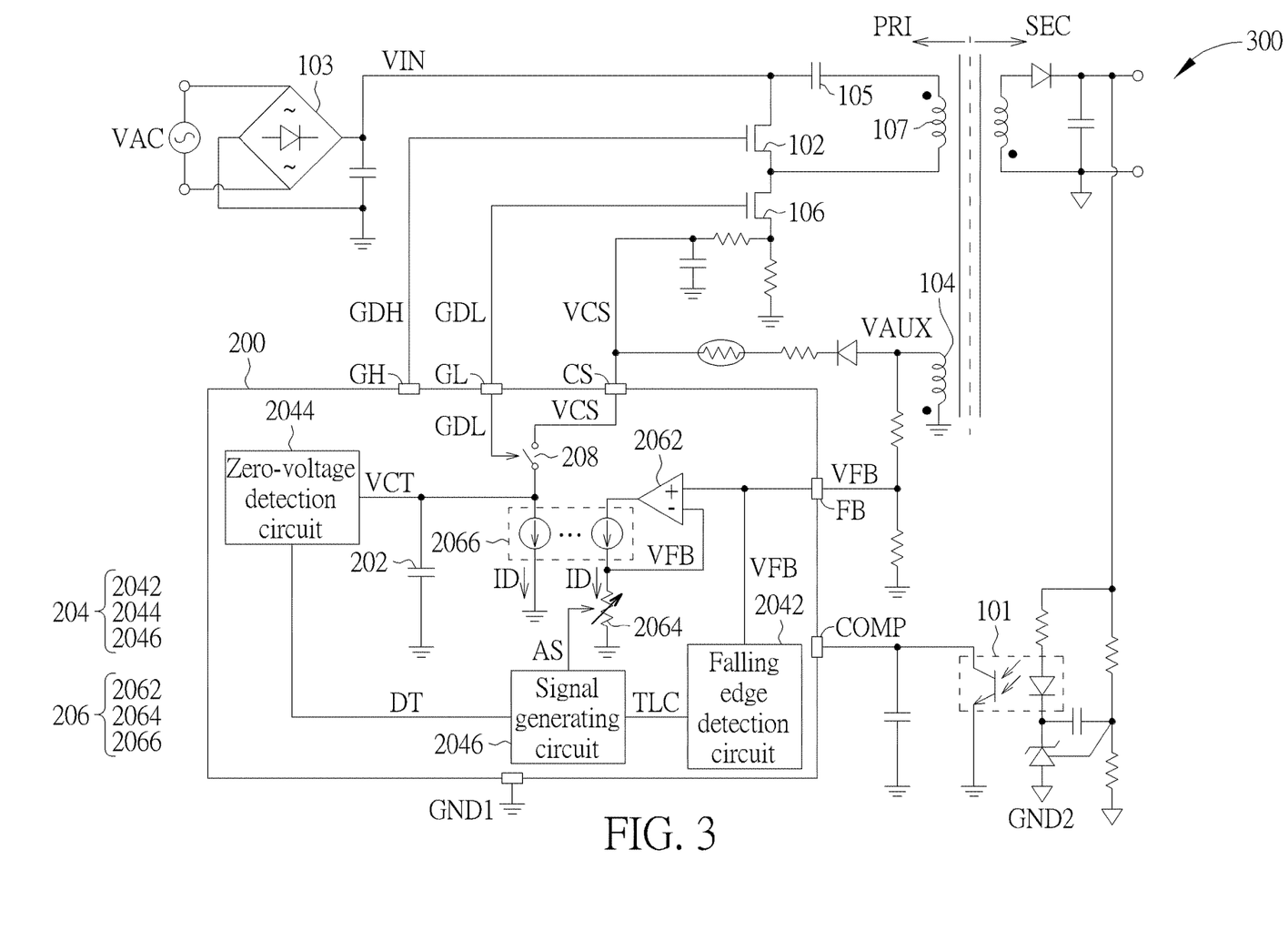
FIG. 3 is a diagram illustrating the controller applied to an asymmetric half-bridge (AHB) flyback power converter according to another embodiment of the present invention.

In addition, please refer to FIG. 3. FIG. 3 is a diagram illustrating the controller 200 applied to an asymmetric half-bridge (AHB) flyback power converter 300 according to another embodiment of the present invention, wherein differences between the asymmetric half-bridge flyback power converter 300 and the active-clamp flyback power converter 100 are that a drain of the upper switch 102 and a capacitor 105 are not connected in series, and the capacitor 105 and a primary-side winding 107 are connected in series to couple between the drain and a source of the upper switch 102. In addition, coupling relationships between the capacitor 105 and the primary-side winding 107 in the asymmetric half-bridge flyback power converter 300 can be referred to FIG. 3, so further description thereof is omitted for simplicity. In addition, principles of the asymmetric half-bridge flyback power converter 300 utilizing the detection voltage VCS and the feedback voltage VFB to generate the tracking voltage VCT (or utilizing the compensation voltage VCOMP and the feedback voltage VFB to generate the tracking voltage VCT) to track a state of a magnetizing current of a primary side PRI of the asymmetric half-bridge flyback power converter 300 can be referred to corresponding descriptions in FIG. 2, so further description thereof is also omitted for simplicity.

Figure 4:
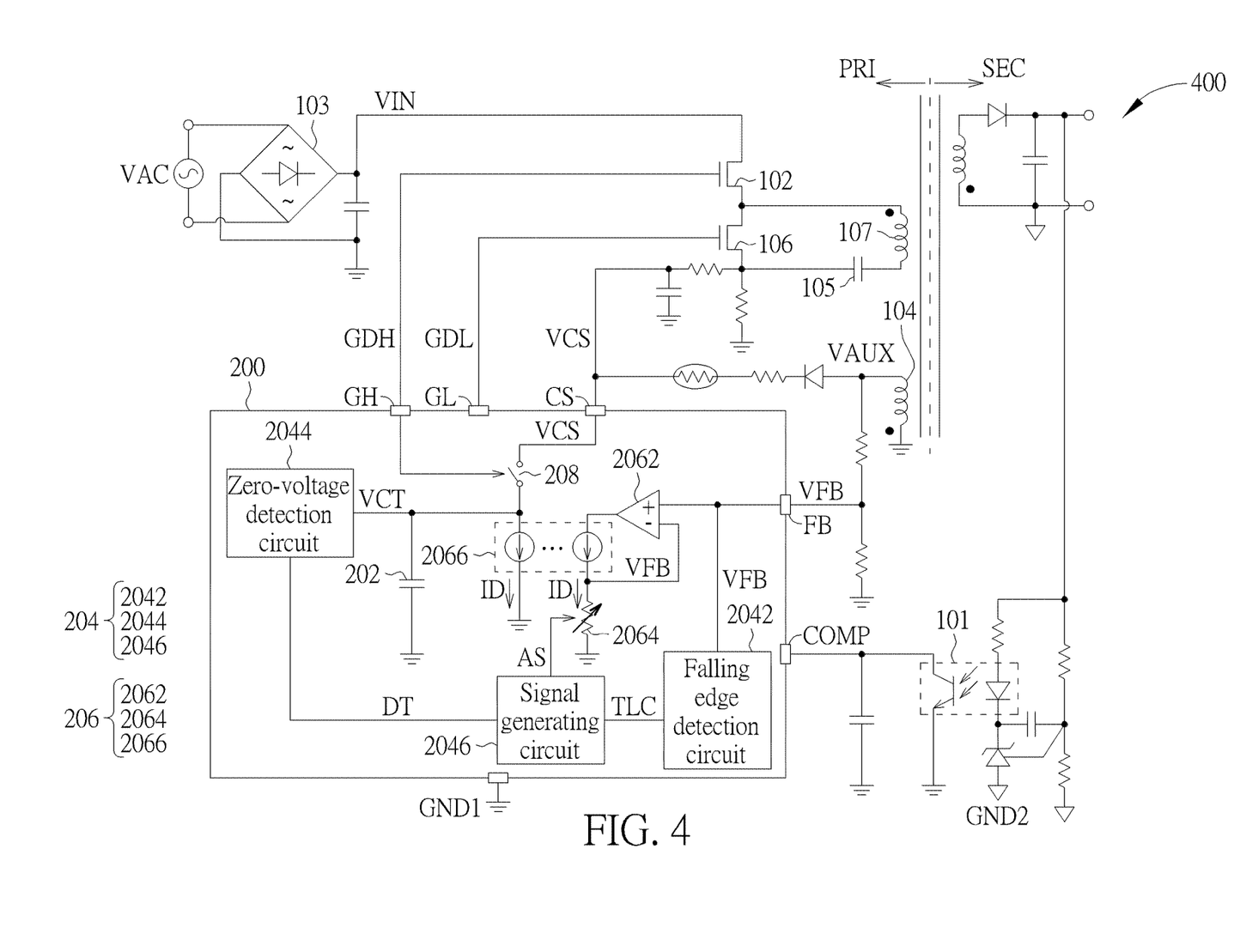
FIG. 4 is a diagram illustrating the controller applied to an asymmetric half-bridge flyback power converter according to another embodiment of the present invention.

In addition, please refer to FIG. 4. FIG. 4 is a diagram illustrating the controller 200 applied to an asymmetric half-bridge flyback power converter 400 according to another embodiment of the present invention, wherein differences between the asymmetric half-bridge flyback power converter 400 and the asymmetric half-bridge flyback power converter 300 are that the capacitor 105 and the primary-side winding 107 are connected in series to couple between a drain and a source of the lower bridge switch 106, and the control terminal of the charge switch 208 is coupled to the pin GH of the controller 200 and used for receiving the upper bridge switch control signal GDH. In addition, coupling relationships between the capacitor 105 and the primary-side winding 107 in the asymmetric half-bridge flyback power converter 400 can be referred to FIG. 4, so further description thereof is omitted for simplicity. In addition, principles of the asymmetric half-bridge flyback power converter 400 utilizing the detection voltage VCS and the feedback voltage VFB to generate the tracking voltage VCT (or utilizing the compensation voltage VCOMP and the feedback voltage VFB to generate the tracking voltage VCT) to track a state of a magnetizing current of a primary side PRI of the asymmetric half-bridge flyback power converter 400 can be referred to the corresponding descriptions in FIG. 2, so further description thereof is also omitted for simplicity.

In addition, operational principles of the upper switch 102 and the lower bridge switch 106 in the active-clamp flyback power converter 100, the asymmetric half-bridge flyback power converter 300, and the asymmetric half-bridge flyback power converter 400 can be referred to "Hybrid-Switching Asymmetrical Half-Bridge Flyback DC-DC Converter", Authors: Yu-Fu Chen, Thuc Duy Nguyen, Jing-Yuan Lin, Yao-Ching Hsieh and Huang-Jen Chiu, Department of Electronic Engineering, National Taiwan University of Science and Technology, Taipei, Taiwan, wherein "Hybrid-Switching Asymmetrical Half-Bridge Flyback DC-DC Converter" is edited by IEEE Xplore at 2016/05/26, the whole content of which is enclosed herein by reference.

Figure 5:
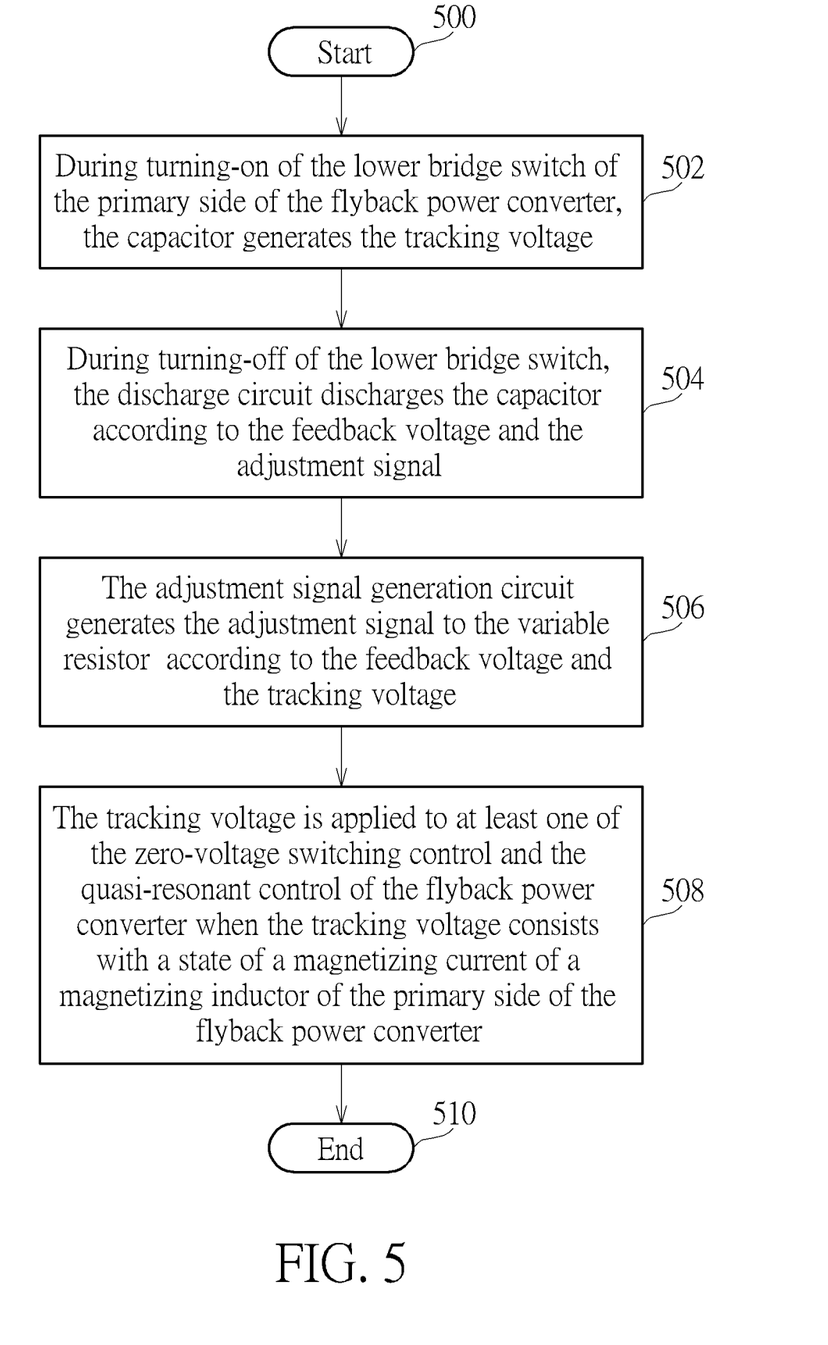
FIG. 5 is a flowchart illustrating an operational method of a controller applied to an active-clamp flyback power converter or an asymmetric half-bridge flyback power converter according to a second embodiment of the present invention.

In addition, please refer to FIG. 1, FIG. 2, FIG. 3, FIG. 4, FIG. 5. FIG. 5 is a flowchart illustrating an operational method of a controller 200 applied to an active-clamp flyback power converter or an asymmetric half-bridge flyback power converter according to a second embodiment of the present invention. Detailed steps are as follows:

Step 500: Start.

Step 502: During turning-on of the lower bridge switch 106 of the primary side PRI of the flyback power converter, the capacitor 202 generates the tracking voltage VCT.

Step 504: During turning-off of the lower bridge switch 106, the discharge circuit 206 discharges the capacitor 202 according to the feedback voltage VFB and the adjustment signal AS.

Step 506: The adjustment signal generation circuit 204 generates the adjustment signal AS to the variable resistor 2064 according to the feedback voltage VFB and the tracking voltage VCT.

Step 508: The tracking voltage VCT is applied to at least one of the zero-voltage switching control and the quasi-resonant control of the flyback power converter when the tracking voltage VCT consists with a state of a magnetizing current of a magnetizing inductor of the primary side PRI of the flyback power converter.

Step 510: End.

Next, take the flyback power converter as the active-clamp flyback power converter 100 and the asymmetric half-bridge flyback power converter 300 as examples:

In Step 502, as shown in FIG. 1, because the first terminal of the charge switch 208 receives the detection voltage VCS through the pin CS, and the control terminal of the charge switch 208 receives the lower bridge switch control signal GDL through the pin GL, when the lower bridge switch control signal GDL is enabled (corresponding to the turning-on of the lower bridge switch 106 of the primary side PRI of the active-clamp flyback power converter 100 or corresponding to turning-on of the lower bridge switch 106 of the primary side PRI of the asymmetric half-bridge flyback power converter 300), the charge switch 208 is turned on to make the capacitor 202 charged according to the detection voltage VCS (i.e. the specific voltage) to generate the tracking voltage VCT.

In Step 504, as shown in FIG. 1, because the resistance of the variable resistor 2064 and the feedback voltage VFB can determine the discharge current ID, when the lower bridge switch control signal GDL is disabled (corresponding to turning-off of the lower bridge switch 106 of the primary side PRI of the active-clamp flyback power converter 100 or corresponding to turning-off of the lower bridge switch 106 of the primary side PRI of the asymmetric half-bridge flyback power converter 300), the charge switch 208 is turned off, meanwhile the discharge current ID can discharge the capacitor 202.

In Step 506, as shown in FIG. 1, the falling edge detection circuit 2042 receives the feedback voltage VFB through the pin FB, and detects the resonance time TLC corresponding to the feedback voltage VFB according to the feedback voltage VFB. The zero-voltage detection circuit 2044 receives the tracking voltage VCT, and detects the discharge time DT corresponding to the tracking voltage VCT according to tracking voltage VCT. The signal generating circuit 2046 generates the adjustment signal AS to the variable resistor 2064 according to the difference between the resonance time TLC and the discharge time DT, wherein the resistance of the variable resistor 2064 can be adjusted according to the adjustment signal AS.

In Step 508, as shown in FIG. 2, between the time T1 and the time T2, the controller 200 enables the lower bridge switch control signal GDL (corresponding to the turning-on of the lower bridge switch 106), meanwhile the charge switch 208 is turned on, so the capacitor 202 can be charged according to the detection voltage VCS (i.e. the specific voltage), resulting in the tracking voltage VCT being gradually increased until the controller 200 starts to disable the lower bridge switch control signal GDL. At the time T2, because the lower bridge switch control signal GDL is disabled and the feedback voltage VFB corresponds to the auxiliary voltage VAUX of the auxiliary winding 104, the feedback voltage VFB rises. After the time T2, because the lower bridge switch control signal GDL is disabled, the discharge current ID starts to discharge the capacitor 202, resulting in the tracking voltage VCT starting to be decreased until zero (at the time T3). Therefore, as shown in FIG. 2, because during the lower bridge switch control signal GDL being enabled, the tracking voltage VCT is gradually increased until the controller 200 starts to disable the lower bridge switch control signal GDL, and during the lower bridge switch control signal GDL being disabled, the tracking voltage VCT starts to be decreased until zero, the tracking voltage VCT can be used for tracking the state of the magnetizing current of the magnetizing inductor of the primary side PRI of the active-clamp flyback power converter 100 (or the asymmetric half-bridge flyback power converter 300). Therefore, when the tracking voltage VCT consists with the state of the magnetizing current, tracking voltage VCT can be applied to at least one of the zero-voltage switching control and the quasi-resonant control of the active-clamp flyback power converter 100 (or the asymmetric half-bridge flyback power converter 300), wherein the zero-voltage switching control corresponds to the critical conduction mode of the active-clamp flyback power converter 100 (or the asymmetric half-bridge flyback power converter 300), meanwhile the load coupled to the secondary side SEC of the active-clamp flyback power converter 100 is heavy, and the quasi-resonant control corresponds to the discontinuous conduction mode of the active-clamp flyback power converter 100 (or the asymmetric half-bridge flyback power converter 300), meanwhile the load coupled to the secondary side SEC of the active-clamp flyback power converter 100 is middle or light). In addition, when the active-clamp flyback power converter 100 (or the asymmetric half-bridge flyback power converter 300) operates in the critical conduction mode, the controller 200 can execute the zero-voltage switching control at the first valley of the feedback voltage VFB after the feedback voltage VFB starts to resonate; when the active-clamp flyback power converter 100 (or the asymmetric half-bridge flyback power converter 300) operates in the discontinuous conduction mode, the controller 200 can execute the quasi-resonant control at the $N^{th}$ valley of the feedback voltage VFB after the feedback voltage VFB starts to resonate, wherein N is an integer greater than 1.

In addition, take the flyback power converter as the asymmetric half-bridge flyback power converter 400 as an example:

In Step 502, as shown in FIG. 1, because the first terminal of the charge switch 208 receives the detection voltage VCS through the pin CS, and the control terminal of the charge switch 208 receives the upper bridge switch control signal GDH through the pin GH, when the upper bridge switch control signal GDH is enabled (corresponding to turning-on of the upper switch 102 of the primary side PRI of the asymmetric half-bridge flyback power converter 400), the charge switch 208 is turned on to make the capacitor 202 charged according to the detection voltage VCS (i.e. the specific voltage) to generate the tracking voltage VCT.

In Step 504, as shown in FIG. 1, because the resistance of the variable resistor 2064 and the feedback voltage VFB can determine the discharge current ID, when the upper bridge switch control signal GDH is disabled (corresponding to turning-off of the upper switch 102 of the primary side PRI of the asymmetric half-bridge flyback power converter 400), the charge switch 208 is turned off, meanwhile the discharge current ID can discharge the capacitor 202.

In Step 508, as shown in FIG. 2, between the time T1 and the time T2, the controller 200 enables the upper bridge switch control signal GDH (corresponding to the turning-on of the upper switch 102), meanwhile the charge switch 208 is turned on, so the capacitor 202 can be charged according to the detection voltage VCS (i.e. the specific voltage), resulting in the tracking voltage VCT being gradually increased until the controller 200 starts to disable the upper bridge switch control signal GDH. At the time T2, because the upper bridge switch control signal GDH is disabled and the feedback voltage VFB corresponds to the auxiliary voltage VAUX of the auxiliary winding 104, the feedback voltage VFB rises. After the time T2, because the upper bridge switch control signal GDH is disabled, the discharge current ID starts to discharge the capacitor 202, resulting in the tracking voltage VCT starting to be decreased until zero (at the time T3). Therefore, as shown in FIG. 2, because during the upper bridge switch control signal GDH being enabled, the tracking voltage VCT is gradually increased until the controller 200 starts to disable the upper bridge switch control signal GDH, and during the upper bridge switch control signal GDH being disabled, the tracking voltage VCT starts to be decreased until zero, the tracking voltage VCT can also be used for tracking the state of the magnetizing current of the magnetizing inductor of the asymmetric half-bridge flyback power converter 400.

To sum up, the controller and the operational method thereof utilize the detection voltage and the feedback voltage to generate the tracking voltage (or utilize the compensation voltage and the feedback voltage to generate the tracking voltage) to track the state of the magnetizing current, and then the tracking voltage is applied to at least one of the zero-voltage switching control and the quasi-resonant control of the active-clamp flyback power converter and the asymmetric half-bridge flyback power converter. Therefore, compared to the prior art, the controller does not require the additional pin and the sensing resistor, so both the cost of the controller and the cost of the package for the controller can be significantly reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A controller applied to a power converter, wherein the controller is installed in a primary side of the power converter, the controller comprising:
   a capacitor for generating a tracking voltage;
   an adjustment signal generation circuit for generating an adjustment signal according to a feedback voltage and the tracking voltage; and
   a discharge circuit for discharging the capacitor according to the feedback voltage and the adjustment signal, wherein the tracking voltage is used for tracking a state of a magnetizing current of a magnetizing inductor of the primary side of the power converter, and when the tracking voltage consists with the state of the magnetizing current, the tracking voltage is applied to at least one of zero-voltage switching (ZVS) control and quasi-resonant (QR) control of the power converter.

2. The controller of claim 1, further comprising:
   a charge switch, wherein the charge switch is turned on during turning-on of a lower bridge switch of the primary side of the power converter to make the capacitor charged according to a specific voltage to generate the tracking voltage.

3. The controller of claim 2, wherein the specific voltage is a detection voltage or a compensation voltage.

4. The controller of claim 1, wherein the discharge circuit discharges the capacitor according to the feedback voltage and the adjustment signal during turning-off of a lower bridge switch of the primary side of the power converter.

5. The controller of claim 1, wherein the adjustment signal generation circuit comprises:
   a falling edge detection circuit for detecting a resonance time according to a falling edge of the feedback voltage;
   a zero-voltage detection circuit for detecting a discharge time according to the tracking voltage; and
   a signal generating circuit coupled to the falling edge detection circuit and the zero-voltage detection circuit, wherein the signal generating circuit generates the adjustment signal according to a difference between the resonance time and the discharge time.

6. The controller of claim 1, wherein the discharge circuit comprises:
   an operational amplifier having a first input terminal, a second input terminal, and an output terminal, wherein the first input terminal is used for receiving the feedback voltage;
   a variable resistor having a first terminal, a second terminal, and a control terminal, wherein the first terminal of the variable resistor is coupled to the second input terminal of the operational amplifier and used for receiving the feedback voltage, the second terminal of the variable resistor is coupled to ground, and the control terminal of the variable resistor is coupled to the adjustment signal generation circuit and used for receiving the adjustment signal, wherein the adjustment signal is used for adjusting a resistance of the variable resistor, and the resistance of the variable resistor and the feedback voltage are used for determining a discharge current; and a current mirror coupled to the output terminal of the operational amplifier, the second input terminal of the operational amplifier, the variable resistor, and the capacitor, wherein the current mirror is used for mirroring the discharge current to discharge the capacitor.

7. The controller of claim 6, wherein the resistance of the variable resistor is changed according to the adjustment signal.

8. The controller of claim 1, wherein the feedback voltage corresponds to an auxiliary voltage of an auxiliary winding of the primary side of the power converter.

9. The controller of claim 1, wherein the power converter is an active-clamp flyback power converter.

10. The controller of claim 1, wherein the power converter is an asymmetric half-bridge (AHB) flyback power converter.

11. An operational method of a controller applied to a power converter, wherein the controller is installed in a primary side of the power converter, and the controller comprises a capacitor, an adjustment signal generation circuit, and a discharge circuit, the operational method comprising:

the capacitor generating a tracking voltage during turning-on of a lower bridge switch of the primary side of the power converter;

the discharge circuit discharging the capacitor according to a feedback voltage and an adjustment signal during turning-off of the lower bridge switch; and the adjustment signal generation circuit generating the adjustment signal to the discharge circuit according to the feedback voltage and the tracking voltage;

wherein the tracking voltage is used for tracking a state of a magnetizing current of a magnetizing inductor of the primary side of the power converter, and when the tracking voltage consists with the state of the magnetizing current, the tracking voltage is applied to at least one of zero-voltage switching control and quasi-resonant control of the power converter.

12. The operational method of claim 11, wherein during turning-on of the lower bridge switch, the capacitor is charged according to a specific voltage to generate the tracking voltage.

13. The operational method of claim 12, wherein the specific voltage is a detection voltage or a compensation voltage.

14. The operational method of claim 11, wherein the discharge circuit discharges the capacitor according to the feedback voltage and the adjustment signal during turning-off of the lower bridge switch of the primary side of the power converter.

15. The operational method of claim 11, wherein the adjustment signal generation circuit generating the adjustment signal according to the feedback voltage and the tracking voltage comprises:

detecting a resonance time according to a falling edge of the feedback voltage;

detecting a discharge time according to the tracking voltage; and generating the adjustment signal according to a difference between the resonance time and the discharge time.

16. The operational method of claim 11, wherein the discharge circuit discharging the capacitor according to the feedback voltage and the adjustment signal comprises:

adjusting a resistance of a variable resistor comprised in the discharge circuit according to the adjustment signal;

determining a discharge current according to the resistance of the variable resistor and the feedback voltage; and discharging the capacitor according to the discharge current.

* * * * *